Figure 1:
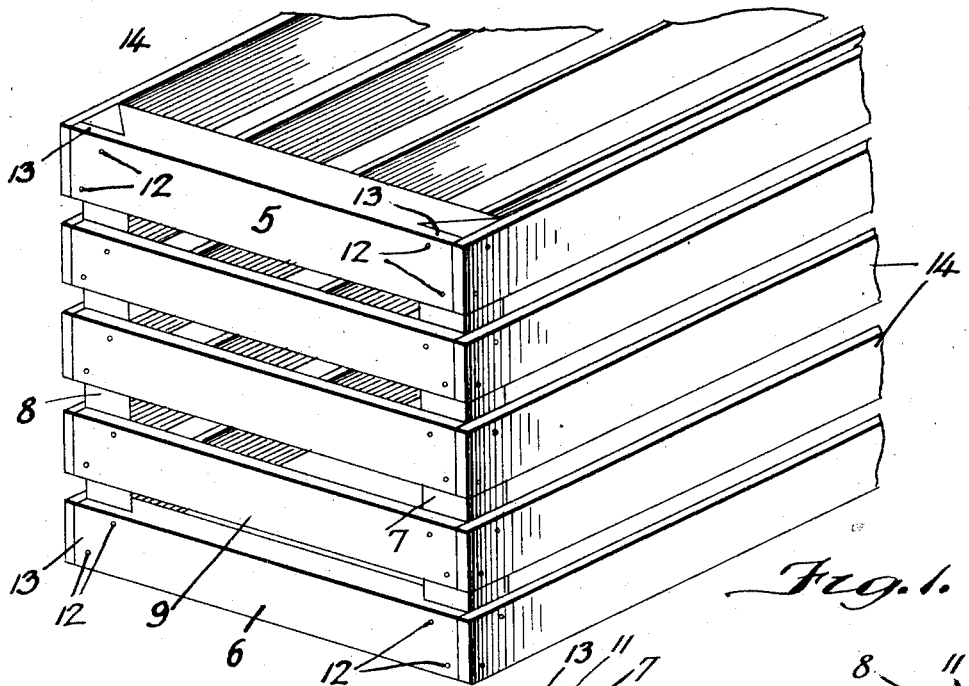

J. HUGHES.
CRATE.
APPLICATION FILED OCT. 13, 1920.

1,388,569. Patented Aug. 23, 1921.

Witness
Inventor
John Hughes
By Ahulton Buck
Attorney

UNITED STATES PATENT OFFICE.

JOHN HUGHES, OF PULLMAN, MICHIGAN, ASSIGNOR TO PULLMAN MANUFACTURING COMPANY, OF PULLMAN, MICHIGAN, A CORPORATION OF MICHIGAN.

CRATE.

1,388,569.        Specification of Letters Patent.      Patented Aug. 23, 1921.

Application filed October 13, 1920. Serial No. 416,626.

*To all whom it may concern:*

Be it known that I, JOHN HUGHES, a citizen of the United States, residing at Pullman, in the county of Allegan and State of Michigan, have invented certain new and useful Improvements in a Crate, of which the following is a specification.

This invention relates to crates, and particularly to receptacles of this kind for use in accommodating fruits, vegetables and other articles of a perishable nature for transportation, and has for one object to provide a crate of such character that the fruit or vegetables to be received thereby at the juncture of the end walls with the sides, bottom and top will be prevented from becoming bruised.

A further object of the invention is to provide a crate which, by reason of the particular construction of the ends and the means of joining the bottom, sides and top thereto, will be rendered durable and the danger of breakage or twisting will be appreciably decreased.

A further object is to provide a relatively large area at the ends of the crate to receive nails driven through the slats of the side, bottom and top, whereby danger of splitting the wood is overcome, the box or crate is rendered more durable and less liable to injury or breakage, and by which construction the crate may be easily and quickly assembled.

With these objects in view together with others which will appear as the description proceeds, the invention consists in the novel construction, combination and arrangement of parts, all as will be described more fully hereinafter, illustrated in the drawing, and particularly pointed out in the claims.

Figures 2, 3, 4:
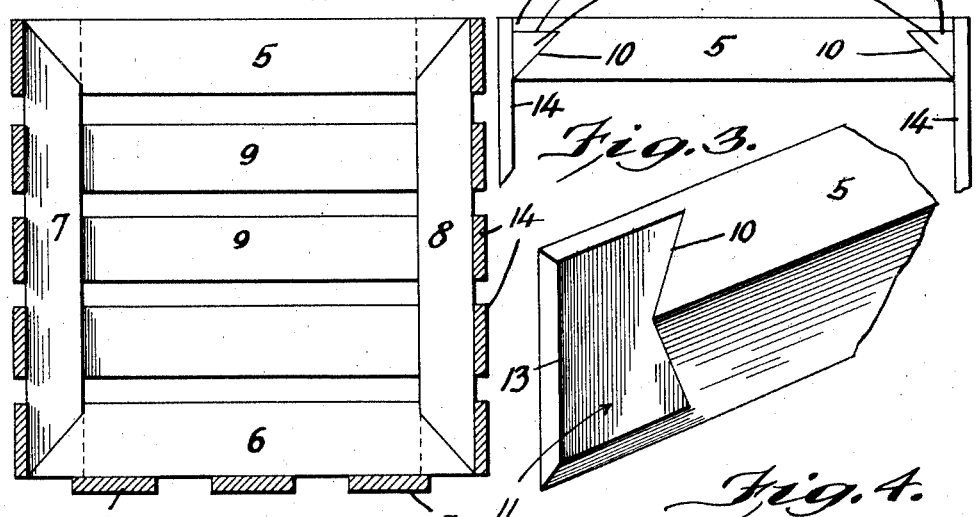

In the drawing:

Figure 1 is a perspective view of one end of a crate constructed in accordance with the invention, the top of the crate being removed to better show the construction and arrangement of the top transverse cleat, Fig. 2 is a sectional view taken transversely through the crate and showing the arrangement of the cleats at one end of the crate, Fig. 3 is a top plan view of one of the crate ends, and Fig. 4 is an enlarged detailed perspective view of one end of one of the cleats.

Referring now more particularly to the drawing, the end frame of the crate comprises top and bottom cleats 5—6 and upright cleats 7—8. These cleats are connected together in the manner shown and form a rectangular open frame to which the transverse end slats 9 are nailed. These slats are secured at their extremities to the upright cleats.

The top and bottom cleats, as well as the upright cleats, are of triangular shape in cross section, and the said top and bottom cleats 5—6 are cut out away angularly so as to provide in their ends recesses corresponding to the shape of the upright piece 7 and 8. As shown in the drawing, and particularly Figs. 1 and 3, the end cleats 7 and 8 are shaped in cross section as a right angle triangle, the longer side of which lies flush against the wall 10 formed by cutting the end of the cleat 5 in the manner shown. The base of the triangle is received by the wall 11 in the end of the cleat 5, the altitude of the triangle being equal to the length of the wall 11. The wall 11 is parallel with the outer edge of the cleat 5 and the distance between the said wall 11 and the outer edge of the cleat is equal to the thickness of the slats 9.

Both ends of the cleat 5 are cut in the manner specified, and the bottom cleat 6 is similarly formed so as to receive and snugly inclose the lower ends of the upright cleats 7 and 8. When the cleats have been fitted together, nails 12 may be driven through the tongue portion 13 of the cleats 5 and 6, these nails entering the upright cleats 7 and 8. The slats 9 may be secured to the upright cleats 7 and 8 by the use of nails, and it will be observed that these slats will lie in the same vertical plane with the outer surface of cleats 5 and 6. The longitudinal slats 14 are secured to the outer surfaces of the cleats 7 and 8 by means of nails or other suitable securing elements, as shown in Figs. 1 and 3. The bottom cleats 15 connect the base portions of cleats 6 at the ends of the crate, and slats constituting the top (not shown) may be similarly fastened to the upper surfaces of the cleats 5.

By so constructing the crate, the corners at the juncture of the bottom, sides and top with the crate ends will be filled by the cleats 5 and 6, and the fruit or vegetables to be packed in the crate will rest upon the smooth inclined inner surfaces of these cleats. Sharp corners at the crate ends are thus overcome, so as to minimize the danger of injuring or bruising the fruit or vegetables. By reason of the angular upright cleats fitting snugly and being secured in recesses of similar shape in the ends of cleats 5 and 6, a rigid structure is obtained, and one in which danger of loosening of the crate end frames by twisting is eliminated. Furthermore, such construction so solidifies the structure of the end frames as to enable the same to withstand strains and pressures to which the crate will of necessity be subjected in handling and transportation. The ends of the slats constituting the sides, bottom and top, as well as the slats 9 of the end frame, have a relatively great surface upon the end frame cleats to which they may be nailed, thereby overcoming the danger of splitting of the wood members and adding greatly to the strength and rigidity of the crate.

While the above is a description of the preferred embodiment of the invention it is obvious that the invention is not necessarily limited thereto, as alterations or changes in the details of the structure may be resorted to without departing from the spirit of the invention as defined by the claims.

What I claim, is:

1. A packing crate including an end frame comprising a bottom and top and two upright cleats each of triangular form and cross section, the bottom and top cleats each being positioned with one flat side outwardly, each of said bottom and top cleats being further provided with a triangular pocket in each end to receive the upright cleats, one wall of each pocket being extended parallel with the outer face of said bottom and top cleats and adapted for engagement with the outer face of said upright cleats while the remaining wall of each pocket being extended at an angle and adapted for engagement with the angular inner faces of said upright cleats, end slats connecting the upright cleats upon their outer faces, said bottom longitudinal cleats secured respectively to the flat side faces of the upright cleats and the flat lower faces of the bottom cleats.

2. A packing crate including an end frame, the said frame comprising bottom and top and two upright cleats, all of triangular shape in cross section, the ends of the bottom and top cleats being cut away to provide walls parallel with the outer surfaces of the said bottom and top cleats and forming tongues to overlie the outer walls of the upright cleats, the said bottom and top cleats being also cut away at an angle to provide walls to lie against the inner surfaces of the upright cleats, slats connecting the upright cleats upon their outer surfaces, and the said slats being of a thickness equal to the thickness of said tongues.

In testimony whereof I affix my signature.

JOHN HUGHES.